(12) United States Patent
Wei et al.

(10) Patent No.: US 7,633,552 B2
(45) Date of Patent: *Dec. 15, 2009

(54) SELF-CALIBRATING TIMING CIRCUITS FOR USE IN A SYNC SEPARATOR

(75) Inventors: Zhinan (Peter) Wei, San Jose, CA (US); Robert David Zucker, Los Altos, CA (US)

(73) Assignee: Intersil Americas Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/176,893

(22) Filed: Jul. 21, 2008

(65) Prior Publication Data

US 2008/0278625 A1 Nov. 13, 2008

Related U.S. Application Data

(63) Continuation of application No. 11/201,065, filed on Aug. 9, 2005, now Pat. No. 7,423,694.

(51) Int. Cl.
*H04N 5/08* (2006.01)

(52) U.S. Cl. .................... 348/525; 348/531

(58) Field of Classification Search .......... 348/525, 348/531, 532, 536, 540, 558; 375/293, 354, 375/364, 362; *H04N 5/08, 5/10, 5/46*
See application file for complete search history.

(56) References Cited

U.S. PATENT DOCUMENTS

| | | | |
|---|---|---|---|
| 3,706,847 A | 12/1972 | Smeulers | |
| 4,185,299 A | 1/1980 | Harford | |
| 4,550,342 A | 10/1985 | Buchanan et al. | |
| 4,603,347 A | 7/1986 | Kuroda et al. | |
| 4,667,235 A | 5/1987 | Nozoe et al. | |
| 4,707,730 A | 11/1987 | Alard | |
| 4,821,098 A | 4/1989 | Smeulers | |
| 4,918,525 A | 4/1990 | Vladkov | |
| 5,280,356 A | 1/1994 | Hiramatsu et al. | |
| 5,486,869 A | 1/1996 | Cooper | |
| 5,576,770 A | 11/1996 | Rumreich | |
| 5,754,250 A | 5/1998 | Cooper | |
| 5,867,222 A | 2/1999 | Norris et al. | |
| 6,028,642 A | 2/2000 | Rinaldi et al. | |
| 6,154,256 A | 11/2000 | Bruins | |
| 6,208,173 B1 | 3/2001 | Redman-White | |
| 6,573,943 B1 | 6/2003 | Harvey | |

*Primary Examiner*—Sherrie Hsia
(74) *Attorney, Agent, or Firm*—Fliesler Meyer LLP

(57) ABSTRACT

Provided herein are self-calibrating timing circuits and methods for use in a sync separator. A comparator compares a video signal to a video reference voltage to produce a sliced sync signal that has a frequency that is equal to a scan frequency of a horizontal sync embedded in the video signal. A first converter converts the sliced sync signal to a control signal having an amplitude or magnitude that is inversely proportional to the scan period of the horizontal sync embedded video signal. A second converter converts the voltage control signal to a timer signal that has timed intervals that are that are inversely proportional to the amplitude or magnitude of the control signal, and thus proportional to the scan period of the horizontal sync embedded in the video signal. These timed intervals produced in accordance with embodiments of the present invention are easily and precisely scalable, allowing them to be used to discriminate various timing features embedded in video signals. This abstract is not intended to be a complete description of, or limit the scope of, the invention.

22 Claims, 6 Drawing Sheets

SELF-CALIBRATING TIMING CIRCUITS FOR USE IN A SYNC SEPARATOR

PRIORITY CLAIM

This application is a continuation of U.S. patent application Ser. No. 11/201,065, filed Aug. 9, 2005 (now allowed), which claims priority under 35U.S.C. 119(e) to U.S. Provisional Patent Application No. 60/691,116, filed Jun. 15, 2005, both of which applications are incorporated herein by reference.

FIELD OF THE INVENTION

Embodiments of the present invention relate to the field of video circuits. More particularly, embodiments of the present invention relate to self-calibrating timing circuits for use in a sync separator.

DESCRIPTION OF THE RELATED ART

FIG. 1 shows an exemplary analog video waveform fragment. Amongst other features, the video signal includes various sync pulses used for receiver scan timing.

The most negative-going features of a video waveform are the various sync details, and they occur in every sequential scan of horizontal video lines traced on a video monitor. Video display frames are transmitted from the upper left hand corner of the screen with video scanning left to right, until it comes to the end of the line, then a horizontal sync signal is issued, causing the display monitor to prepare for scanning the next line, again from left to right. This occurs for a few hundred lines until the display has finished the bottom line, after which modifications of the horizontal sync called vertical sync waveforms (not shown) are issued. The vertical sync details also achieve the same negative levels as the horizontal sync, and prepare the display to begin scanning the top horizontal line of the next full-screen display.

Vertical syncs are longer and much more complex than horizontal syncs, and the job of a sync separator is to recognize vertical sync features and other features embedded in the waveform as well. Sync separators use timers to discover vertical syncs. They also use timers to discover embedded macrovision features, if present, and timers prevent erroneous horizontal or vertical outputs in the presence of macrovision. Finally, in the case of dual-field scan input standards, additional timers will be employed to detect even or odd field details embedded in vertical syncs.

A challenge sync separator designs have is that the device should correctly recognize sync features over a wide variety of analog video standards, with more than a 4:1 range in horizontal sync frequency. It is difficult to use fixed timers to effectively detect all these features in varying frequency inputs. What is needed are variable timers that scale their timed intervals in concert with the incoming horizontal scan period.

SUMMARY OF THE INVENTION

In accordance with an embodiment of the present invention, a variable timer is provided which scales its timed intervals in concert with an incoming horizontal scan period. Fortunately, the video features that are to be detected generally have their timed-intervals scaled with the horizontal scan period. According, an auto-scaled self calibrating timing circuit, in accordance with an embodiment of the present invention, provides a good scheme for a wide variety of video standards.

In accordance with an embodiment of the present invention, a self-calibrating timing circuit for use in a sync separator includes a comparator having a first input that receives an analog composite video signal, a second input that receives a video reference voltage, and an output that provides a sliced sync signal that is indicative of sync features embedded in the video signal. The self-calibrating timing circuit also includes a frequency-to-voltage converter (also referred to as a control voltage generator) and a voltage-to-timed interval converter (also referred to as a timer, or voltage controlled timer). The frequency-to-voltage converter converts the sliced sync signal to a voltage control signal having an amplitude that is inversely proportional to the scan period of the video signal. The voltage-to-timed interval converter converts the voltage control signal to a timer signal that has timed intervals that are inversely proportional to the amplitude of the voltage control signal, and thus proportional to the scan period of the video signal.

In accordance with an embodiment of the present invention, the voltage control signal, produced by the frequency-to-voltage converter, is provided to a standard detector that detects a standard of the video signal based on the amplitude of the voltage control signal. The standard detector can then output a digital signal indicative of the detected standard.

In accordance with an alternative embodiment of the present invention, a self-calibrating timing circuit includes a frequency-to-current converter (also referred to as a control current generator) and a current-to-timed interval converter (also referred to as a timer, or current controlled timer). The frequency-to-current converter converts a sliced sync signal (produced by a comparator) to a current control signal having a magnitude that is inversely proportional to the scan period of the video signal. The current-to-timed interval converter converts the current control signal to a timer signal that has timed intervals that are inversely proportional to the magnitude of the current control signal, and thus proportional to the scan period of the video signal.

In accordance with an embodiment of the present invention, the current control signal, produced by the frequency-to-current converter, is provided to a standard detector that detects a standard of the video signal based on the magnitude of the current control signal. The standard detector can then output a digital signal indicative of the detected standard.

Further embodiments, and the features, aspects, and advantages of the present invention will become more apparent from the detailed description set forth below, the drawings and the claims.

DETAILED DESCRIPTION

Figure 2:
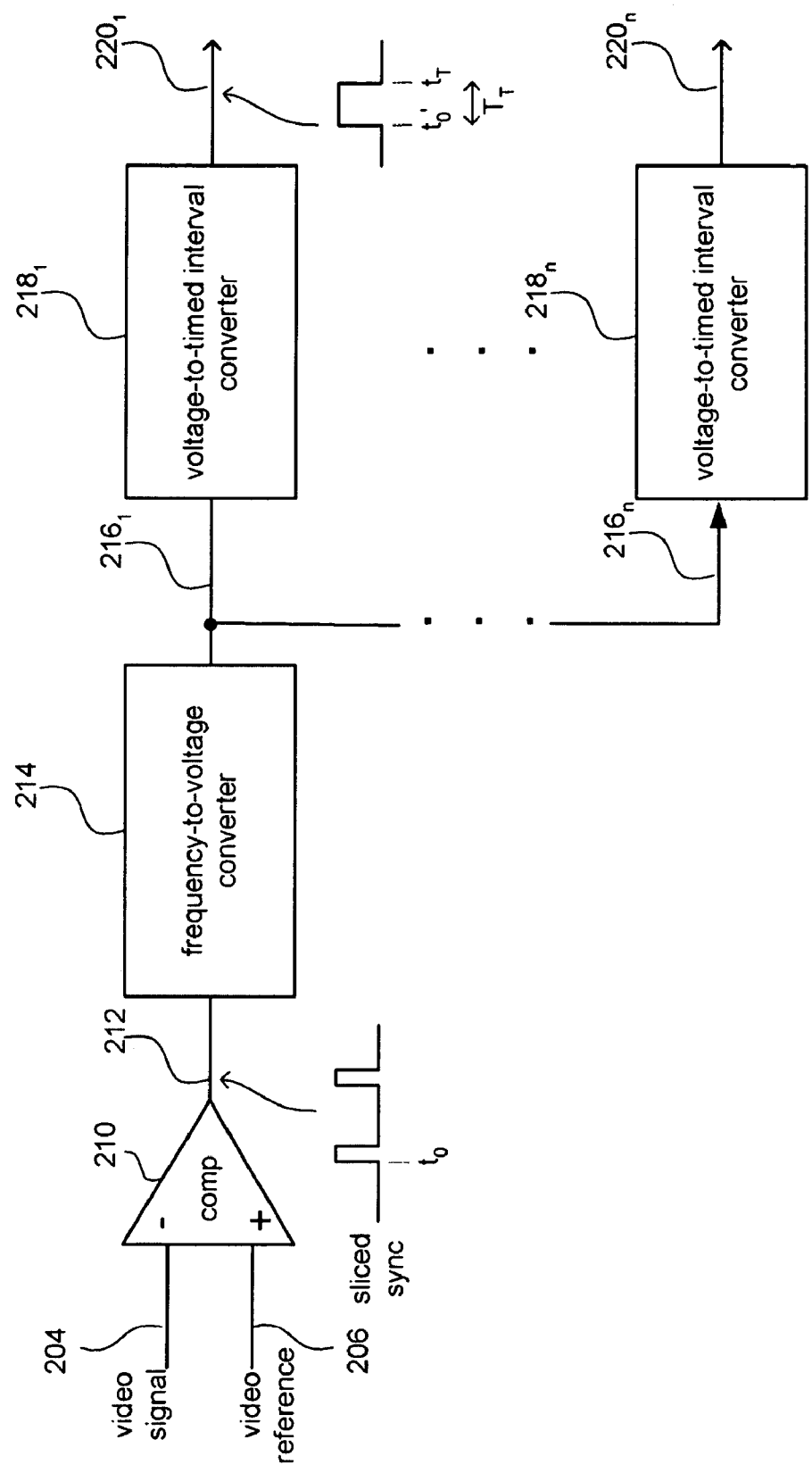
FIG. 2 is a high level block diagram of a self-calibrating timing circuit, according to an embodiment of the present invention.

FIG. 2 illustrates a self-calibrating timing circuit 202, for use in a sync separator circuit, according to an embodiment of the present invention. In this embodiment, the self-calibrating timing circuit 202 includes a comparator 210, a frequency-to-voltage converter 214 and one or more voltage-to-timed interval converter 218.

The comparator 210 includes a pair of inputs (+ and −) and an output. The output of the comparator is Low when the signal at the (−) input is greater than the signal at the (+) input, and is High when the signal at the (−) input is less than the signal at the (+) input.

An incoming analog video signal 204 is presented to the (−) input of the comparator 210, and a video reference voltage 206 is presented to the (+) input of the comparator. In accordance with an embodiment of the present invention, the video reference voltage 206 is just above the most negative features (the syncs) of the incoming analog video signal 204. One of ordinary skill in the art will understand that there are a number of ways in which the video reference voltage can be produced, including, but not limited to, negative peak detection, sample-and-holding, and clamping of the analog video signal 204. Exemplary circuits and methods that can be used to produce such a video reference are described, for example, in U.S. Pat. No. 6,573,843 to Harvey, which is incorporated herein by reference. One of ordinary skill in the art will appreciate that alternative ways of producing the video reference voltage 206 are also within the spirit and scope of the present invention.

The output of comparator 210 is often referred hereafter as a sliced sync signal 212. Since all incoming non-sync voltages will be more positive than the video reference voltage 206, the comparator 210 outputs a logic Low during non-sync features of the video signal 204, and a logic High during sync features of the video signal. In other words, the sliced sync signal 212 output by the comparator 210 is a waveform whose positive pulses are indicative of sync events. Usefully, the frequency of the positive pulses of the sliced sync signal 212 is equal to the scan frequency ($F_{scan}$) of the analog video signal 204.

Figure 1:
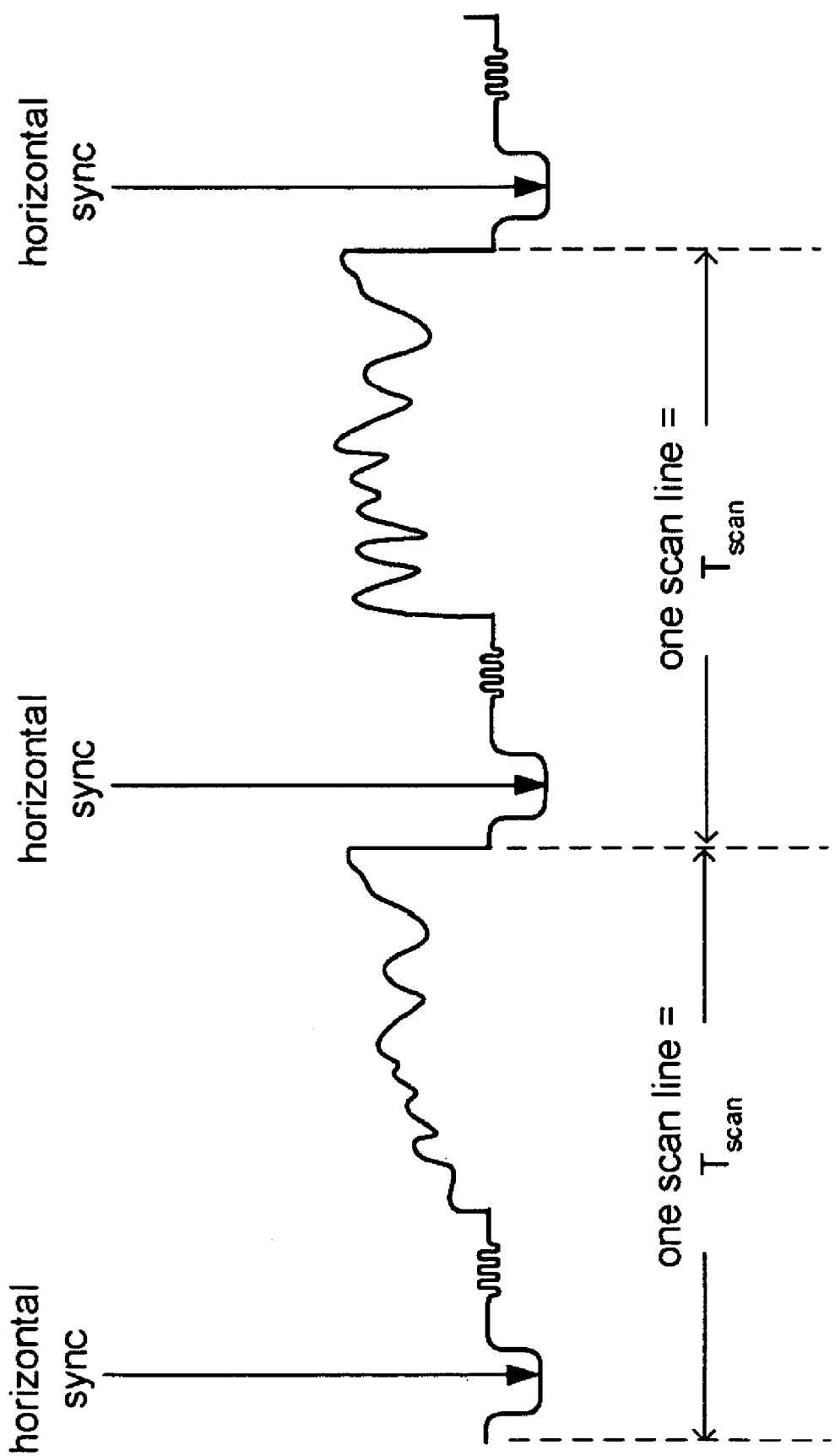
FIG. 1 shows a exemplary fragment of an analog video waveform.

As shown in FIG. 2, the sliced sync signal 212 is provided to the frequency-to-voltage converter 214. In accordance with an embodiment of the present invention, the frequency-to-voltage converter 214 outputs a DC voltage signal 216 having an amplitude that is proportional to the frequency of the sliced sync signal 212, and thus proportional the scan frequency ($F_{scan}$). Since $F_{scan}=1/T_{scan}$, where $T_{scan}$ is the scan period as shown in FIG. 1, it can also be said that the voltage signal 216 has an amplitude that is inversely proportional to the scan period ($T_{scan}$). Since the voltage signal 216 is used to control the voltage-to-timed interval converter 218, the voltage signal 216 will often be referred to hereafter as a voltage control signal 216 (or simply as $V_{control}$). For similar reasons, the frequency-to-voltage converter 214 may sometimes be referred to hereafter as a control voltage generator 214. Additional details of the control voltage generator 214, according to an embodiment of the present invention, will be described below with reference to FIG. 3.

Still referring to FIG. 2, the voltage control signal 216 is provided to the voltage-to-timed interval converter 218. In accordance with an embodiment of the present invention, the voltage-to-timed interval converter 218 outputs a pulsed voltage signal 220 with the timed interval of the pulses being inversely proportional to $V_{control}$, and thus proportional to the scan period ($T_{scan}$) shown in FIG. 1. Since the voltage-to-timed interval converter 218 can be used to implement timers, block 218 may sometimes be referred to hereafter as a timer 218. For similar reasons, the output 220 of the timer 218 may be referred to hereafter as a timer output 220. Additional details of the timer 218, according to an embodiment of the present invention, will be described below with reference to FIG. 4. It is noted that where there is more the one timer 218, the timed intervals output by the one timer 218 may differ from the timed intervals output by another timer 218, yet the different intervals will still be proportional to the scan period ($T_{scan}$).

Figure 3:
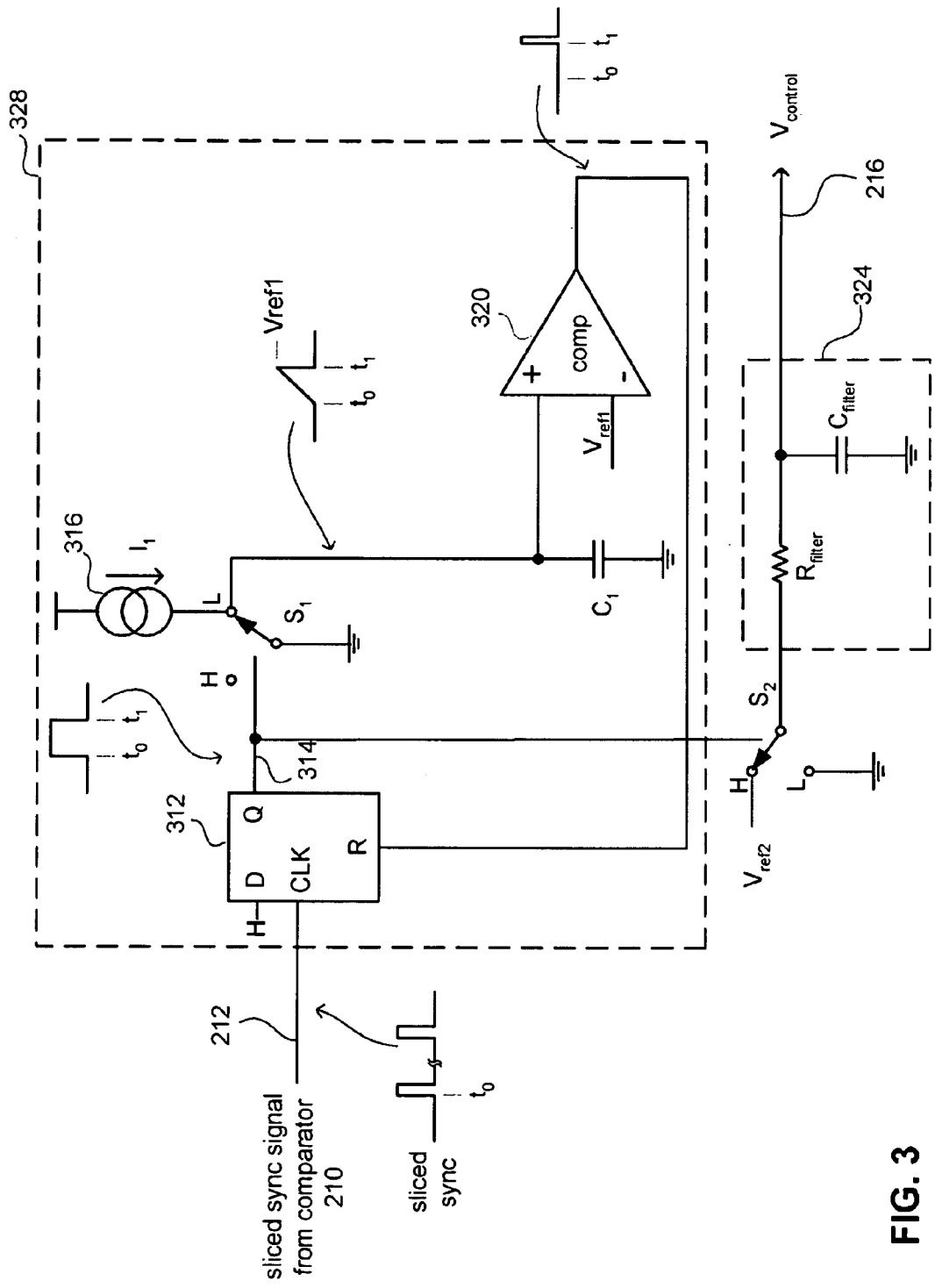
FIG. 3 is a high level circuit diagram of the frequency-to-voltage converter of the self-calibrating timing circuit of FIG. 2, according to an embodiment of the present invention.

FIG. 3 will now be used to describe additional details of the frequency-to-voltage converter 214 (also referred to as the control voltage generator 214), according to an embodiment of the present invention. In the embodiment of FIG. 3, the control voltage generator 214 is shown as including a D-flip-flop 312, switches $S_1$ and $S_2$, a current source 316, a capacitor $C_1$, a comparator 320, and a low pass filter 324. As shown, a High logic level (H) is provided to the D input of the D-flip-flop 312, and the sliced sync signal 212 is provided to the clock input (CLK) of the D-flipflop 214. In this arrangement, the rising edge of the sliced sync signal 212 clocks the D-flip-flop 312 to accept the High input. The output of D-flipflop 312 controls the switch $S_1$. When the output of the D-flipflop 214 is logic level Low (L), the switch $S_1$ causes the charging capacitor $C_1$ to be shorted to ground. When the output of the D-flipflop 312 is logic level High (H), the switch $S_1$ is opened, thereby causing the current $I_1$ (provided by the current source 316) to charge the capacitor $C_1$ positive. When the charge on the capacitor $C_1$ exceeds $V_{ref1}$, the output of the comparator 320 goes from logic level Low to logic level High, whereupon the D-flipflop 312 is reset, thereby causing the output of the D-flip-flop to return to logic level Low. The period or timed interval of charging ($T_1$) is as follows:

$$T_1 = V_{ref1} * C_1 / I_1 \quad \text{(equation 1)}$$

where $T_1 = t_1 - t_0$.

This results in a signal 314, at the Q output of the D-flipflop 312, having a frequency that is still equal the scan frequency ($F_{scan}$), with each pulse width equal to the charging period $T_1$. This signal 314 controls the switch $S_2$, which is used to selectively connect a further reference voltage $V_{ref2}$ to the low pass filter 324.

In accordance with an embodiment of the present invention, the low pass filter 324 includes a resistor $R_{filter}$ and a capacitor $C_{filter}$ arranged as shown. However, it is noted that other low pass filters can be employed while still being within the spirit and scope of the present invention. Referring to the arrangement of FIG. 3, while the output of the D-flipflop 312 is High, the switch $S_2$ connects the resistor $R_{filter}$ to the voltage reference ($V_{ref2}$). While the output of the D-flipflop 312 is Low, the switch $S_2$ connects the resistor $R_{filter}$ to ground. This occurs every sync, resulting in a train of pulses $T_1$ wide being applied to the switch $S_2$. In response to this train of pulses $T_1$ wide, the switch $S_2$ applies the voltage reference ($V_{ref2}$) to the low-pass filter 324, which essentially smoothes out the pulse train and creates an average control voltage value 216, where:

$$V_{control} = F_{sync} * T_1 * V_{ref2} \quad \text{(equation 2)}.$$

Since, $F_{scan}$ is equal to $1/T_{scan}$, equation 2 can be rewritten as follows:

$$V_{control} = T_1 * V_{ref2} / T_{scan} \quad \text{(equation 3)}.$$

Since equation 1 says that $T_1 = V_{ref1} * C_1 / I_1$, equation 3 can be rewritten as follows:

$$V_{control} = (V_{ref1} * V_{ref2} * C_1)/(I_1 * T_{scan}) \quad \text{(equation 4)}.$$

Since $V_{ref1}$, $V_{ref2}$, $C_1$ and $I_1$ are constants, it can be seen from equation 4 how $V_{control}$ is inversely proportional to $T_{scan}$.

It is noted that the combination of the D-flipflop 312, the charging capacitor $C_1$, the switch $S_1$ and the comparator 320 create a one-shot circuit 328. The input of the one-shot circuit 328 accepts the sliced sync signal 212, and the output of the one-shot circuit is signal 314, which as explained above, is a pulsed signal having a duty cycle that is inversely proportional to the scan period. One of ordinary skill in the art will appreciate that the one-shot circuit 328 can be realized in other ways, and should thus not be limited to the implementation shown in FIG. 3.

Figure 4:
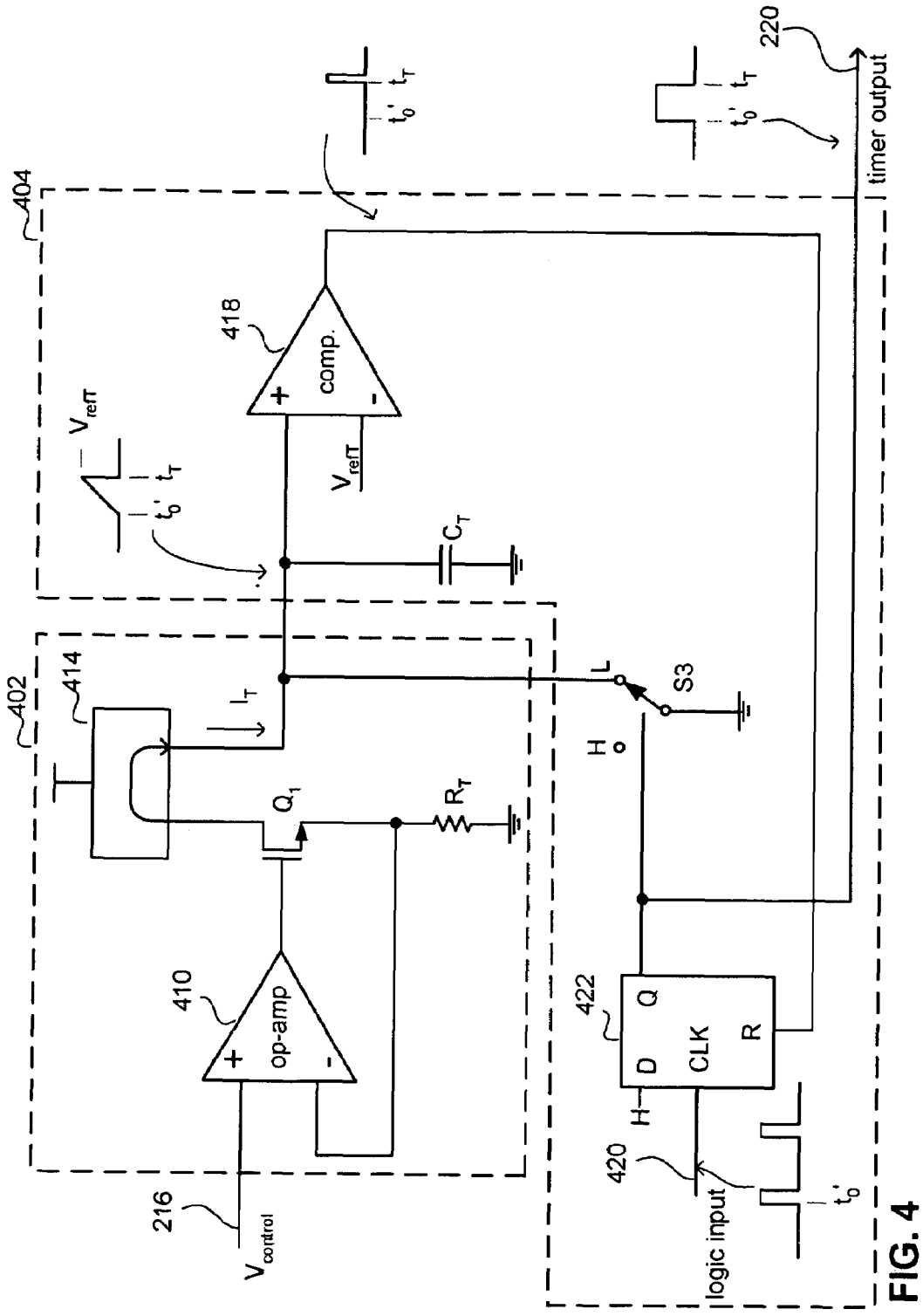
FIG. 4 is a high level circuit diagram of the voltage-to-timed interval converter of the self-calibrating timing circuit of FIG. 2, according to an embodiment of the present invention.

As mentioned, several timers are used in sync separators to discover embedded features in the video signal. FIG. 4 shows a schematic for a timer 218 (also referred to as a voltage-to-timed interval converter 218), according to an embodiment of the present invention. As will be appreciated from the following description, the timer 218 makes use of the $V_{control}$ signal 216 to adjust a timed interval.

In the embodiment of FIG. 4, the timer 218 is shown as including a voltage-to-current converter 402 and a current-to-timed interval converter 404. The voltage-to-current converter 402 converts the $V_{control}$ signal 216 to a current signal $I_T$ that is proportional to $V_{control}$. The current-to-timed interval converter 404 converts the current signal $I_T$ to a voltage signal 220 having pulses whose timed intervals ($T_T$) are inversely proportional to the amplitude of the $V_{control}$ signal 216, and thus, proportional to the scan period $T_{scan}$.

In accordance with an embodiment of the present invention, the voltage-to-current converter 402 includes an op-amp 410, a transistor $Q_1$, a current mirror 414 and a resistor $R_T$. The op-amp 410 includes a pair of inputs (+ and −) and an output. The $V_{control}$ signal 216 is provided to the (+) input of the op-amp 410. The output of the op-amp is provided to the gate of the transistor $Q_1$. The drain of the transistor $Q_1$ is connected to the input of the current mirror 414. The source of the transistor $Q_1$ is connected to the (−) input of the op-amp 410. The resistor $R_T$ is connected between the source of the transistor $Q_1$ and ground. The transistor $Q_1$ is shown as being an NMOS device, but can alternatively be an NPN bipolar device. The op-amp 410 forces the source (or emitter) of the transistor $Q_1$ to replicate $V_{control}$ onto the resistor $R_T$, making the current at the input of the current mirror 414 equal to $V_{control}/R_T$. The current at the output of the current mirror 414 mirrors current at its input, causing $I_T=V_{control}/R_T$ (assuming an arbitrary gain of 1, which need not be the case).

In accordance with an embodiment of the present invention, the current-to-timed interval converter 404 includes a capacitor $C_T$, a comparator 418, a switch $S_3$ and a D-flipflop 422. A logic input 420 provides an edge that clocks a High into the D-flip-flop 422. The logic input 420 (provided to the CLK input of the flip-flop 422) could be, e.g., the sliced sync signal 212 or other logic or timer modifications of the sliced sync signal 212. The Q output of the D-flipflop 422 controls the switch $S_3$. When the output of the D-flipflop 422 is logic level Low, the switch $S_3$ causes the capacitor $C_T$ to be shorted to ground. When the output of the D-flipflop 422 is logic level High, the switch $S_3$ is opened, thereby causing the current $I_T$ to charge the capacitor $C_T$ positive. When the charge on the capacitor $C_T$ exceeds $V_{refT}$, the output of the comparator 418 goes from logic level Low to logic level High, resetting the D-flipflop 422, and thereby causing the output of the D-flip-flop to return to logic level Low. The timer period or timed interval ($T_T$) is defined as:

$$T_T = C_T * V_{refT}/I_T \quad \text{(equation 5)},$$

where $T_T = t_T - t_0'$.

Since $I_T = V_{control}/R_T$, equation 5 can be rewritten as follows:

$$T_T = R_T * C_T * V_{refT}/V_{control} \quad \text{(equation 6)}.$$

Since $V_{control} = (V_{ref1} * V_{ref2} * C_1)/(I_1 * T_{scan})$, as shown above in equation 5, equation 6 can be rewritten as follow:

$$T_T = T_{scan} * I_1 * R_T * C_T * V_{refT}/(C_1 * V_{ref1} * V_{ref2}) \quad \text{(equation 7)}.$$

In accordance with an embodiment of the present invention, $I_1$ can be derived from some voltage source $V_1$ and some resistor $R_1$, (e.g., $I_1 = V_1/R_1$), allowing equation 7 to be rewritten as follows:

$$T_T = T_{scan} * V_1 * R_t * C_t * V_{refT}/(R_1 * C_1 * V_{ref1} * V_{ref2}) \quad \text{(equation 8)}.$$

In accordance with an embodiment of the present invention, the voltage references in equation 8 are the same, or are derived from a common reference. In accordance with an embodiment of the present invention, the resistors scale each other and share systematic process variation. Similarly, in accordance with an embodiment of the present invention, the capacitors scale each other and share systematic process variation. In such a case, which will be especially true in integrated circuit processes where components match very well, equation 8 can be reduced to:

$$T_T = T_{scan} * K \quad \text{(equation 9)}$$

where K is the constant ratio of voltages and resistors and capacitors from equation 8.

In accordance with embodiments of the present invention, the circuits of FIG. 2-4 create timers whose timed intervals automatically vary as a percentage of the scanning period ($T_{scan}$) of the incoming video signal. These circuits also reduce, and preferably eliminate, calibration errors due to voltage, resistor, and capacitor systematic values.

Described above is are self-calibrating timing circuits for use in a so-called "Sync Separator" that discovers various synchronizing features embedded in analog video signals. In accordance with specific embodiments, the self-calibrating timing circuits provide self-calibrating mechanisms that automatically calibrate the circuits for a wide variety of incoming video standards and also minimize and preferably eliminate errors resulting from systematic component variations.

Figure 5:
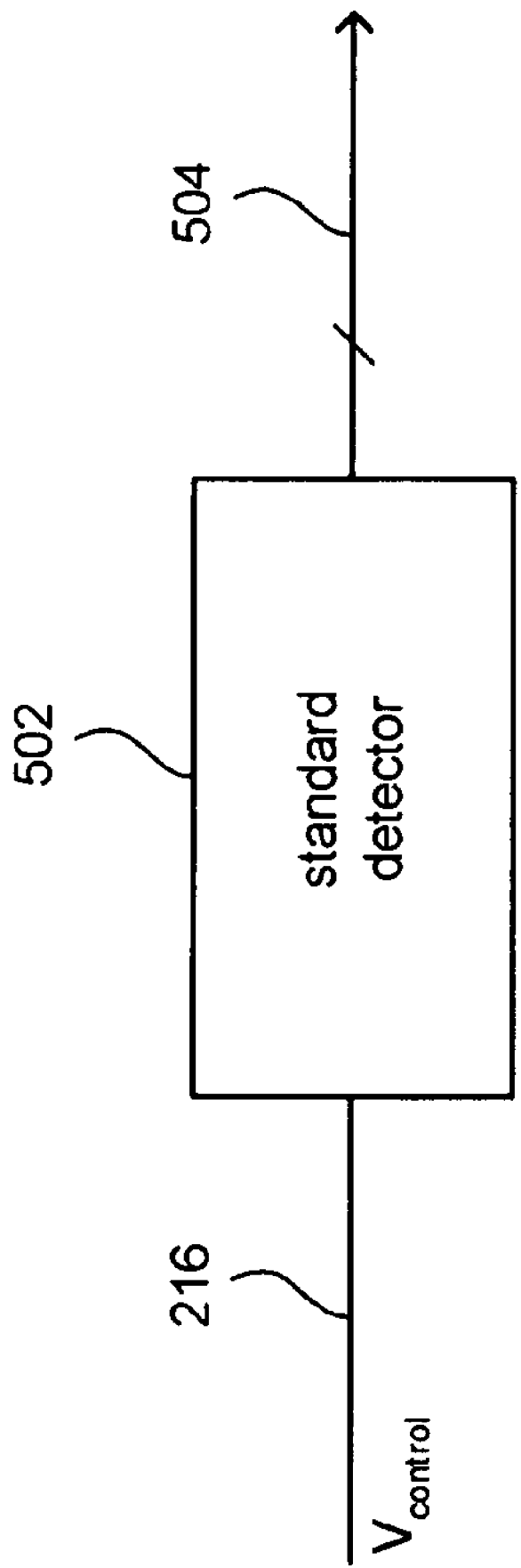
FIG. 5 is a high level block diagram of a video standard detector, according to an embodiment of the present invention.

Because the above described embodiments of the present invention are self-calibrating, they can be used with a wide variety of incoming video standards. Examples of such standards include: NTSC (National Television System Committee), PAL (Phase Alternating Line), SECAM (Sequential Couleur Avec Memoire or Sequential Colour with Memory), etc. Referring back to FIG. 2, it would be useful if the standard of the incoming video signal 204 can be accurately detected. Specific embodiments of the present invention, which will now be described with reference to FIG. 5, provide such a capability. As shown in FIG. 5, the $V_{control}$ signal 216 can also be provided to a standard detector 502, in accordance with an embodiment of the present invention. As explained above, the $V_{control}$ signal 216 is a DC voltage signal having an amplitude that is proportional to the frequency of the sliced sync signal 212, and thus proportional the scan frequency ($F_{scan}$). Since $F_{scan} = 1/T_{scan}$, where $T_{scan}$ is the scan period as shown in FIG. 1, it can also be said that the $V_{control}$ signal 216 has an amplitude that is inversely proportional to the scan period ($T_{scan}$). Different standards have different scan periods. Thus, the amplitude of the $V_{control}$ signal 216 will be dependent on the standard of the incoming video signal 204. Accordingly, as shown in FIG. 5, the $V_{control}$ signal 216 can be provided to a standard detector 502 that can detect the standard based on the amplitude of the $V_{control}$ signal 216. The standard detector 502 can then output a digital signal 504 that is indicative of the detected standard.

The standard detector 502 can be implemented in a variety of manners. For example, the standard detector 502 can include an analog-to-digital (A/D) converter and a look-up-table (LUT). More specifically, the A/D converter can convert the $V_{control}$ signal 216 to a digital value, which can then be used as an input to the LUT. The LUT can include a plurality of value ranges, with each range corresponding to a different standard. Based on the value provided from the A/D converter to the LUT, the LUT can output the digital signal 504 which is indicative of the detected standard. The digital signal 504 can then be provided to further video circuitry which can process the incoming video signal 204 appropriately, based on its standard. This is just one example of how the standard detector 502 can be implemented. One of ordinary skill in the art will appreciate from this description that the standard detector 502 can be implemented in other manners while still being within the spirit and scope of the present invention.

Figure 6:
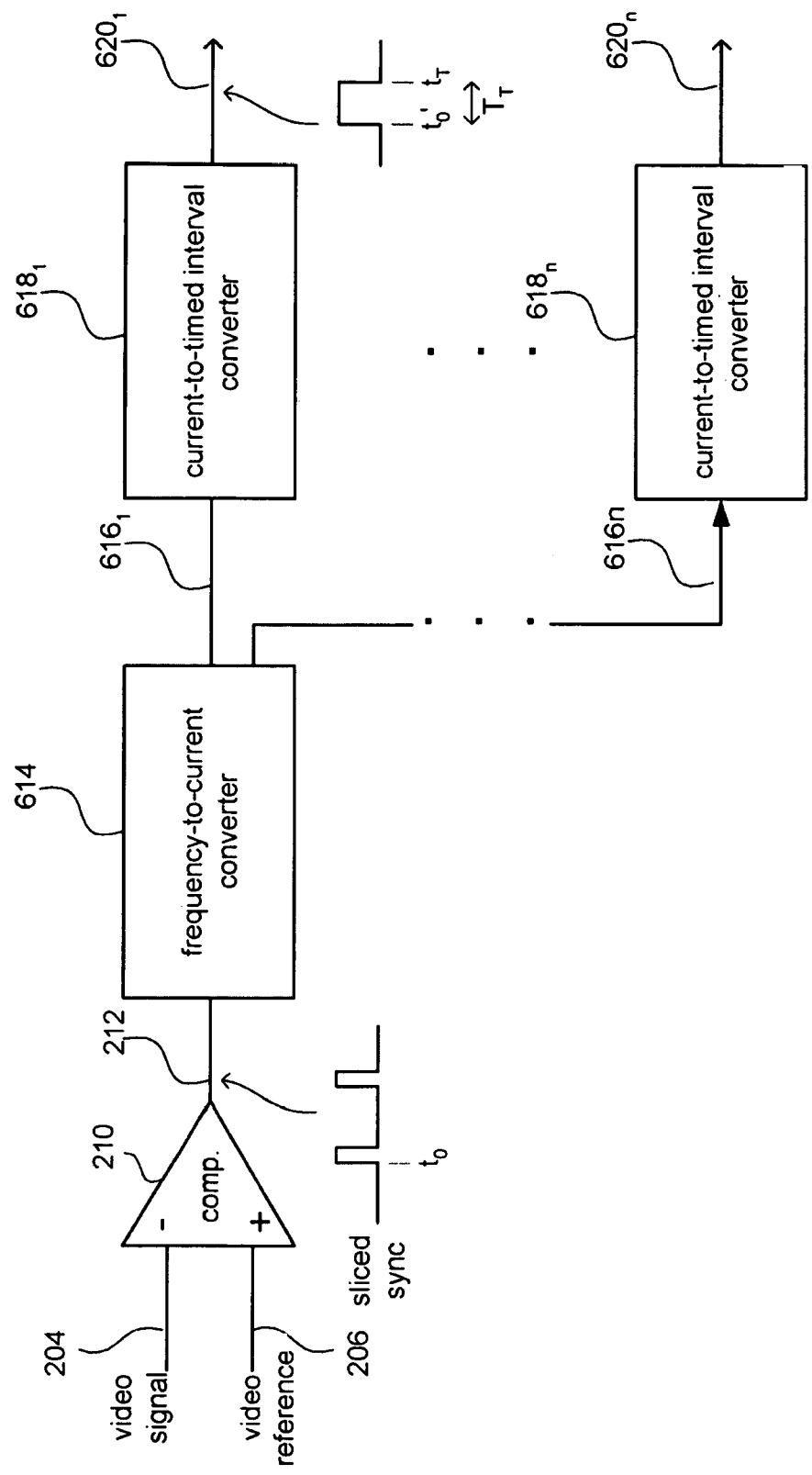
FIG. 6 is a high level block diagram of a self-calibrating timing circuit, according to an alternative embodiment of the present invention.

Referring now to FIG. 6, in accordance with an alternative embodiment of the present invention, a self-calibrating timing circuit 602 includes a frequency-to-current converter 614 and one or more current-to-timed interval converter 618 (also referred to as a timer 618, or current controlled timer 618). The embodiment of FIG. 6 is similar to the embodiment of FIG. 2, except that the invention is realized using current control, rather than voltage control. More specifically, in the embodiment of FIG. 6, the frequency-to-current converter 616 converts the sliced sync signal 212 to a current control signal 616 having a magnitude that is inversely proportional to the scan period of the horizontal sync embedded the video signal 204. Based on the description above, one of ordinary skill in the art would understand how to implement such a circuit. Additionally, in the embodiment of FIG. 6, the current-to-timed interval converter 618 converts the current control signal 616 to a timer signal 620 that has timed intervals that are inversely proportional to the current control signal 616, and thus proportional to the scan period of the horizontal sync embedded in the video signal. Based on the description above, one of ordinary skill in the art would understand how to implement such a circuit. For example, the current-to-timed interval converter 404, shown in FIG. 4, can be used.

As was the case in the embodiment of FIG. 2, in the embodiment of FIG. 6, where there is more the one timer 618, the timed intervals output by the one timer 618 may differ from the timed intervals output by another timer 618, yet the different intervals will still be proportional to the scan period ($T_{scan}$).

The standard detector 502, described above with reference to FIG. 5, detects a video standard based on the amplitude of the $V_{control}$ signal 216. In accordance with an alternative embodiment of the present invention, a standard detector can detect a video standard based on the magnitude of the current control signal 616, discussed with reference to FIG. 6. This is because the magnitude of the current control signal 616 is inversely proportional scan period, and different standards have different scan periods. Thus, such an alternative standard detector would detect a standard based on the magnitude of the current control signal 616. This can be done by directly analyzing the magnitude of the current control signal 616, or by converting the current control signal 616 to a voltage, and then detecting a standard based on the magnitude of the voltage.

Embodiments of the present invention can be used with various types of video signals (each associated with a different video standard) including, but not limited to, composite signals, super-video (S-video) signals, component signals, RGB signals, and computer video signals. In composite video, which is used by televisions in the United States, all display information (including the red, blue, and green signals) are mixed together, with the sync features embedded in the single composite video signal. In S-video, video information is divided into two separate signals, including one for color (chrominance), and the other for brightness (luminance). In S-video, the sync features are embedded in the luminance signal, which is also referred to as the Y signal. Component video includes three separate signals, one of which conveys the luminance information, and the other two convey information of the color content of a picture. In component video, the sync features are embedded in the luminance video signal. In RGB video, there are separate Red, Green and Blue signals, with the sync features embedded in the Green video signal. In computer video signals the sync features are typically included in there own dedicated signals. As can be appreciated from the discussion above, embodiments of the present invention use whichever video signal includes the sync features to produce the timer signal that has timed intervals that are proportional to the scan period of the horizontal sync embedded in the video signal. Nevertheless, such timer signals can then be used to detect features in any video signal, including those that do not include sync features.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Unless otherwise specified, alternate boundaries can be defined so long as the specified functions and relationships thereof are appropriately performed. Any such alternate boundaries are thus within the scope and spirit of the claimed invention.

The breadth and scope of the present invention should not be limited by any of the above-described exemplary embodiments, but should be defined only in accordance with the following claims and their equivalents.

What is claimed is:

1. A self-calibrating timing circuit for use in a sync separator, comprising:
   a comparator to compare a video signal to a reference voltage to thereby produce a sliced sync signal indicative of sync features embedded in the video signal;
   a first converter to convert the sliced sync signal to a control signal having an amplitude or magnitude that is inversely related to the scan period of the horizontal sync embedded in the video signal; and
   a second converter to convert the control signal to a timer signal that has timed intervals that are inversely related to the amplitude or magnitude of the control signal, and thus related to the scan period of the horizontal sync embedded in the video signal.

2. The circuit of claim 1, wherein:
   the control signal comprises a voltage control signal having an amplitude that is inversely related to the scan period of the horizontal sync embedded in the video signal; and
   the timer signal has timed intervals that are inversely related to the amplitude of the voltage control signal, and thus related to the scan period of the horizontal sync embedded in the video signal.

3. The circuit of claim 1, wherein:
the control signal comprises a current control signal having a magnitude that is inversely related to the scan period of the horizontal sync embedded in the video signal; and
the timer signal has timed intervals that are inversely related to the magnitude of the current control signal, and thus related to the scan period of the horizontal sync embedded in the video signal.

4. The circuit of claim 1, wherein:
the amplitude or magnitude of the control signal is inversely related to the scan period by being inversely proportional to the scan period;
the timed intervals are inversely related to the amplitude or magnitude of the control signal by being inversely proportional to the amplitude or magnitude of the control signal; and
the timed intervals are related to the scan period by being proportion to the scan period.

5. The circuit of claim 1, wherein an amplitude of the reference voltage is just above an amplitude of sync features embedded in the video signal.

6. The circuit of claim 1, wherein the first converter comprises:
a one-shot circuit to receive the sliced sync signal and to produce a pulsed signal having a duty cycle that is inversely related to the scan period of the horizontal sync embedded in the video signal; and
a low pass filter including an input and an output;
wherein the input of the low pass filter is selectively connected to one of a further reference voltage and ground, based on the pulsed signal; and
wherein an output of the low pass filter comprises the control signal.

7. The circuit of claim 1, wherein:
the control signal comprises a voltage control signal having an amplitude that is inversely related to the scan period of the horizontal sync embedded in the video signal;
the timer signal has timed intervals that are inversely related to the amplitude of the voltage control signal, and thus related to the scan period of the horizontal sync embedded in the video signal; and
the second converter is configured to convert the voltage control signal to a current signal having a magnitude that is inversely related to the scan period of the horizontal sync embedded in the video signal, and to convert the current signal to the timer signal that has timed intervals that are inversely related to the amplitude of the voltage control signal, and thus related to the scan period of the horizontal sync embedded in the video signal.

8. The circuit of claim 1, further comprising:
a detector to detect a standard of the video signal based on the amplitude or magnitude of the control signal.

9. The circuit of claim 1, further comprising:
a detector to accept the control signal a to produce, based on the control signal, and detector output signal indicative of a standard of the video signal.

10. A method for producing a self-calibrated timing signal for use in a sync separator, comprising:
(a) comparing a video signal to a reference voltage to produce a sliced sync signal indicative of sync features embedded in the video signal;
(b) converting the sliced sync signal to a control signal having an amplitude or magnitude that is inversely related to the scan period of the horizontal sync embedded in the video signal; and
(c) converting the control signal to a timer signal that has timed intervals that are inversely related to the amplitude or magnitude of the control signal, and thus related to the scan period of the horizontal sync embedded in the video signal.

11. The method of claim 10, wherein:
the control signal comprises a voltage control signal having an amplitude that is inversely related to the scan period of the horizontal sync embedded in the video signal; and
the timer signal has timed intervals that are inversely related to the amplitude of the voltage control signal, and thus related to the scan period of the horizontal sync embedded in the video signal.

12. The method of claim 10, wherein:
the control signal comprises a current control signal having a magnitude that is inversely related to the scan period of the horizontal sync embedded in the video signal; and
the timer signal has timed intervals that are inversely related to the magnitude of the current control signal, and thus related to the scan period of the horizontal sync embedded in the video signal.

13. The method of claim 10, wherein:
the amplitude or magnitude of the control signal is inversely related to the scan period by being inversely proportional to the scan period; and
the timed intervals are inversely related to the amplitude or magnitude of the control signal by being inversely proportional to the amplitude or magnitude of the control signal; and
the timed intervals are related to the scan period by being proportion to the scan period.

14. The method of claim 10, wherein an amplitude of the video reference voltage is just above an amplitude of sync features embedded in the video signal.

15. The method of claim 10, wherein step (b) includes
(b.1) producing, based on the sliced sync signal, a pulsed signal having a duty cycle that is inversely related to the scan period of the horizontal sync embedded in the video signal; and
(b.2) selectively connecting an input of a low pass filter to one of a further reference voltage and ground, based on the pulsed signal, to thereby produce the control signal at an output of the low pass filter.

16. The method of claim 10, wherein the control signal comprises a voltage control signal having an amplitude that is inversely related to the scan period of the horizontal sync embedded in the video signal, and wherein step (c) includes:
(c.1) converting the voltage control signal to a current signal having a magnitude that is inversely related to the scan period of the horizontal sync embedded in the video signal; and
(c.2) converting the current signal to the timer signal that has timed intervals that are inversely related to the amplitude of the voltage control signal, and thus related to the scan period of the horizontal sync embedded in the video signal.

17. The method of claim 10, further comprising:
(d) detecting, based on the amplitude or magnitude of the control signal, a standard of the video signal.

18. The method of claim 17, further comprising:
(e) outputting a signal that is indicative of the detected standard.

19. A self-calibrating circuit for use in a sync separator, comprising:
a comparator to compare a video signal to a reference voltage to thereby produce a sliced sync signal indicative of sync features embedded in the video signal;
a converter to convert the sliced sync signal to a control signal having an amplitude or magnitude that is inversely related to the scan period of the horizontal sync embedded in the video signal; and a detector to detect a standard of the video signal based on the amplitude or magnitude of the control signal.

20. The circuit of claim 19, wherein the detector outputs a signal indicative of the detected standard.

21. A method for use in a sync separator, comprising:
(a) comparing a video signal to a reference voltage to produce a sliced sync signal indicative of sync features embedded in the video signal;
(b) converting the sliced sync signal to a control signal having an amplitude or magnitude that is inversely related to the scan period of the horizontal sync embedded in the video signal; and
(c) detecting, based on the amplitude or magnitude of the control signal, a standard of the video signal.

22. The method of claim 21, further comprising:
(d) outputting a signal indicative of the detected standard.

* * * * *

UNITED STATES PATENT AND TRADEMARK OFFICE
CERTIFICATE OF CORRECTION

PATENT NO.        : 7,633,552 B2
APPLICATION NO.   : 12/176893
DATED             : December 15, 2009
INVENTOR(S)       : Zhinan Peter Wei et al.

It is certified that error appears in the above-identified patent and that said Letters Patent is hereby corrected as shown below:

In Claim 9, at Column 9, Line 54, after "signal" replace "a" with --and--; and

In Claim 9, at Column 9, Line 55, after "signal," replace "and" with --a--.

Signed and Sealed this
Twenty-sixth Day of April, 2011

David J. Kappos
*Director of the United States Patent and Trademark Office*